US007423685B2

United States Patent
Morimoto

(10) Patent No.: US 7,423,685 B2
(45) Date of Patent: Sep. 9, 2008

(54) IMAGE-TAKING APPARATUS WITH FIRST CONTROL METHOD IN WHICH FOCUS LENS IS DRIVEN BASED UPON SIGNAL FROM IMAGE-PICKUP DEVICE AND SECOND CONTROL METHOD IN WHICH FOCUS LENS IS DRIVEN BASED ON SIGNAL REPRESENTING OBJECT DISTANCE

(75) Inventor: Yosuke Morimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 669 days.

(21) Appl. No.: 10/926,958

(22) Filed: Aug. 27, 2004

(65) Prior Publication Data

US 2005/0046711 A1 Mar. 3, 2005

(30) Foreign Application Priority Data

Sep. 2, 2003 (JP) ............................. 2003-310792

(51) Int. Cl.
*H04N 5/262* (2006.01)
*H04N 5/232* (2006.01)
*G03B 13/00* (2006.01)

(52) U.S. Cl. .................... 348/347; 348/240.1; 348/345; 348/348; 348/353

(58) Field of Classification Search ... 348/240.1–240.2, 348/347–350, 345, 353–354, 356; 396/93
See application file for complete search history.

(56) References Cited

U.S. PATENT DOCUMENTS 6,236,431 B1 * 5/2001 Hirasawa et al. ....... 348/240.99
7,116,364 B2 * 10/2006 Battles et al. ............ 348/240.1
2004/0037546 A1 * 2/2004 Nonaka ...................... 396/121
2005/0036775 A1   2/2005 Morimoto ...................... 36/67
2005/0104994 A1   5/2005 Morimoto ................... 348/345

FOREIGN PATENT DOCUMENTS

JP       2002-258147       9/2002

* cited by examiner

*Primary Examiner*—Lin Ye
*Assistant Examiner*—Daniel M Pasiewicz
(74) *Attorney, Agent, or Firm*—Fitzpatrick, Cella, Harper & Scinto

(57) ABSTRACT

An image-taking apparatus capable of appropriate AF control without depending on a zoom enlargement ratio is disclosed. The image-taking apparatus includes a signal processing section which generates an image signal based on the output signal of an image-pickup device and has an electronic zoom function electrically processing part of the image signal to generate an enlarged output image and a controller which controls the driving of the focus lens by using a first control method and a second control method which is different from the first control method. The controller changes a control method to be used between the first and second control method in a first zooming state including at least a state in which the electronic zoom function is not in use and a second zooming state using the electronic zoom function which has a zoom enlargement ratio larger than that of the first zooming state.

8 Claims, 8 Drawing Sheets

IMAGE-TAKING APPARATUS WITH FIRST CONTROL METHOD IN WHICH FOCUS LENS IS DRIVEN BASED UPON SIGNAL FROM IMAGE-PICKUP DEVICE AND SECOND CONTROL METHOD IN WHICH FOCUS LENS IS DRIVEN BASED ON SIGNAL REPRESENTING OBJECT DISTANCE

BACKGROUND OF THE INVENTION

1. Field of the Invention

The present invention relates to focus control on an image-taking apparatus.

2. Description of the Related Art

A hybrid AF control method is available as an auto focus (AF) control method used for an image-taking apparatus such as a video camera. This hybrid AF control method combines a so-called TV-AF method which controls a focus lens so that an AF evaluated value signal obtained by extracting a high-frequency component (contrast component) from an output signal of an image-pickup device becomes a maximum and a control method which calculates a driving amount of a focus lens using a signal from a sensor which measures a distance to an object or an amount of defocusing (e.g., see Japanese Patent Application Laid-Open No. 2002-258147).

This hybrid AF control method achieves high focusing accuracy in the TV-AF method, however, it requires a long focusing time to search for the lens position at which the AF evaluated value signal becomes a maximum. Therefore, it is designed to shorten the focusing time with reference to a signal from a separately provided sensor.

Furthermore, Japanese Patent Application Laid-Open No. 2002-258147 proposes a hybrid AF structure which combines a TV-AF method and an internal measuring method in which incident light through an image-taking optical system is separated and received by a sensor. Then an amount of defocusing is measured based on the light signal received. Furthermore, the same Application also proposes a combination of a TV-AF method with an external measuring method which provides a distance sensor else an image-taking optical system.

The internal measuring method has an advantage of reliably capturing an object because imaging object-image is also formed on the sensor. However, since a spectroscopic mechanism needs to be provided in an image-taking optical path, the sizes of the lens barrel and the whole image-taking apparatus tend to increase. In recent years, there is a growing demand for miniaturization of a consumer image-taking apparatus such as a video camera, and in this sense, the internal measuring method which imposes limitation on the sizes and layout of components mounted is not desirable.

On the other hand, since the external measuring method only arranges a distance sensor independently of an image-taking optical system, it has a high degree of freedom in layout, and is therefore advantageous to reduce the size of the image-taking apparatus.

However, since the aforementioned external measuring method arranges the distance sensor independently of the image-taking optical system, there is a gap between the optical axis of the image-taking optical system and measuring axis of the distance sensor, producing a problem of so-called parallax. FIG. 2 shows a relationship between the image-taking range and the measuring range of the distance sensor when the image-taking apparatus zooms in toward the telephoto side.

Since the image-taking angle of view on the telephoto side is narrow, the distance sensor captures an object B which is different from an object A whose image is actually taken as shown in FIG. 2. For this reason, there is a possibility that the hybrid AF control will not function appropriately, such as not to achieve to focusing on the object or to need long time in focusing.

Especially, a digital camera or video camera in recent years is provided with an electronic zoom function which performs display and record enlarging an object image taken by an image-pickup device such as a CCD or CMOS sensor through electric processing. This electronic zoom function performs pseudo-zooming beyond the zoom magnifying ratio (on the order of 10× to 20× in a video camera) through electric processing, realizing zooming of up to several tens to several hundreds of times.

At this time, since the apparent image-taking angle of view narrows considerably, it becomes extremely difficult to reliably capture the object within the image-taking angle of view using a distance sensor, further increasing the possibility that the hybrid AF control will not function appropriately.

SUMMARY OF THE INVENTION

It is one of objects of the present invention to provide an image-taking apparatus, a focus control method and a processing program to execute this method allowing adequate AF control without depending on the zoom enlargement ratio.

An image-taking apparatus according to the present invention as an aspect comprises an image-pickup device which photoelectrically converts an object image formed by an image-taking optical system including focus lens, a signal processing section which generates an image signal based on the output signal of the image-pickup device and has an electronic zoom function electrically processing part of the image signal to generate an enlarged output image, and a controller which controls the driving of the focus lens by using a first control method and a second control method which is different from the first control method. The controller changes a control method to be used between the first and second control method in a first zooming state including at least a state in which the electronic zoom function is not in use and a second zooming state using the electronic zoom function which has a zoom enlargement ratio larger than that of the first zooming state.

Here, "changing a control method to be used" includes not only switching between the first control method and second control method but also switching between simultaneous use of the first and second control methods, and use of only the first control method.

Furthermore, a focus control method and a processing program for executing this method according to the present invention as another aspect comprises a step of controlling the driving of the focus lens by using a first control method and a step of controlling the driving of the focus lens by using a second control method which is different from the first control method. It further includes a step of changing a control method to be used between the first and second control method according to a first zooming state including at least a state in which the electronic zoom function is not in use and a second zooming state using the electronic zoom function which has a zoom enlargement ratio larger than that of the first zooming state.

The features of the image-taking apparatus, focus control method and processing program will become more apparent from the following detailed description of a preferred embodiment of the invention with reference to the drawings.

DETAILED DESCRIPTION OF THE PREFERRED EMBODIMENTS

With reference now to the attached drawings, embodiments of the present invention will be explained below.

Figure 1:
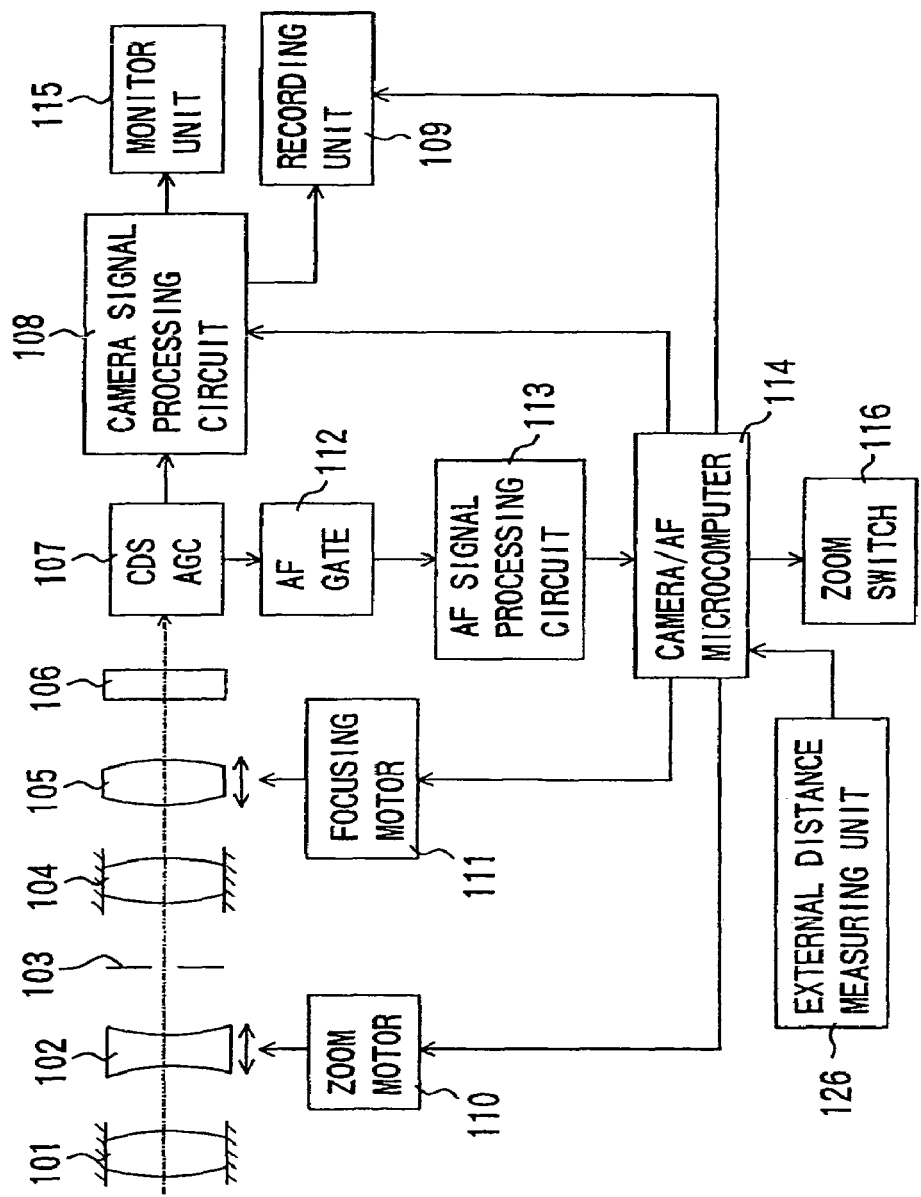
FIG. 1 is a block diagram showing a structure of an image-taking apparatus according to Embodiment 1 of the present invention.

FIG. 1 shows a structure of an image-taking apparatus according to Embodiment 1 of the present invention. This embodiment will describe a type of image-taking apparatus integral with an image-taking lens, but the present invention is also applicable to an image-taking apparatus in which an image-taking lens can be mounted. In this case, a control signal generated by a camera/AF microcomputer, which will be described later, is communicated with a microcomputer in the image-taking lens and the microcomputer controls the driving of the focus lens unit. Furthermore, this embodiment will describe a video camera, but the present invention is also applicable to various types of image-taking apparatus such as a digital still camera.

In FIG. 1, reference numeral 101 denotes a first fixed lens unit, 102 denotes a lens unit which changes magnification (hereinafter referred to as "zoom lens unit"), 103 denotes a stop, 104 denotes a second fixed lens unit and 105 denotes a lens unit provided with a focusing function and a so-called compensator function which corrects movements of the image surface when magnification is changed (hereinafter referred to as "focus lens unit"). The image-taking optical system composed of these lens units is a rear-focus optical system made up of four lens units having optical powers of positive, negative, positive, positive in that order from the object side (the left side in the figure). Note that the figure illustrates as if each lens unit with one lens, but each lens unit may compose of one lens or also a plurality of lenses.

The zoom lens unit 102 and focus lens unit 105 can be moved in the optical axis direction (lateral direction in the figure) by a zoom motor 110 and a focusing motor 111, respectively.

The incident light from an object passes through the lens units and stop 101 to 105 and an image thereof is formed on an image-pickup device 106. The image-pickup device 106 is a photoelectrical conversion element such as a CCD sensor or CMOS sensor and converts the object image formed on the image-pickup surface to an electrical signal. The electrical signal output from the image-pickup device 106 is read by a CDS/AGC circuit 107, amplified and input to a camera signal processing circuit 108.

The camera signal processing circuit 108 applies predetermined processing to the signal input from the CDS/AGC circuit 107 and generates an image signal that matches recording and display by a storage unit 109 and monitor unit 115. The storage unit 109 records the input image signal in a recording medium (magnetic tape, optical disk, semiconductor memory, etc.). The monitor unit 115 displays the object image on a display of an electronic view finder or liquid crystal panel, etc., based on the input image signal.

On the other hand, the image signal output of the CDS/AGC circuit 107 is also output to an AF gate 112. The AF gate 112 selects a signal within the screen range to be used for focus control from the image signal corresponding to the full screen and outputs the signal to the AF signal processing circuit 113. Here, the image range used for focus control can be arbitrarily set and a plurality of ranges can also be set.

The AF signal processing circuit 113 extracts an AF evaluated value signal (focus evaluated value signal) such as a high-frequency component used for focus control by TV-AF and luminance difference component (difference between maximum value and minimum value of luminance level of an image signal) from the input image signal and outputs this signal to the camera/AF microcomputer 114.

The camera/AF microcomputer 114 outputs a control signal to the focusing motor Ill so as to search for the position (in-focus position) of the focus lens unit 108 at which the level of the AF evaluated value signal becomes a maximum and drives the focus lens unit 105 by a predetermined amount at a time. This control method is a so-called "TV-AF method" (first control method).

The camera/AF microcomputer 114 controls the entire image-taking apparatus. The aforementioned output of the AF signal processing circuit 113 and the output of an external distance measuring unit 126, which will be described later, are input to the camera/AF microcomputer 114 and used to calculate AF control. The camera/AF microcomputer 114 outputs a control signal to the aforementioned focusing motor 111 depending on the calculation result and drives the focus lens unit 105.

Figure 3:
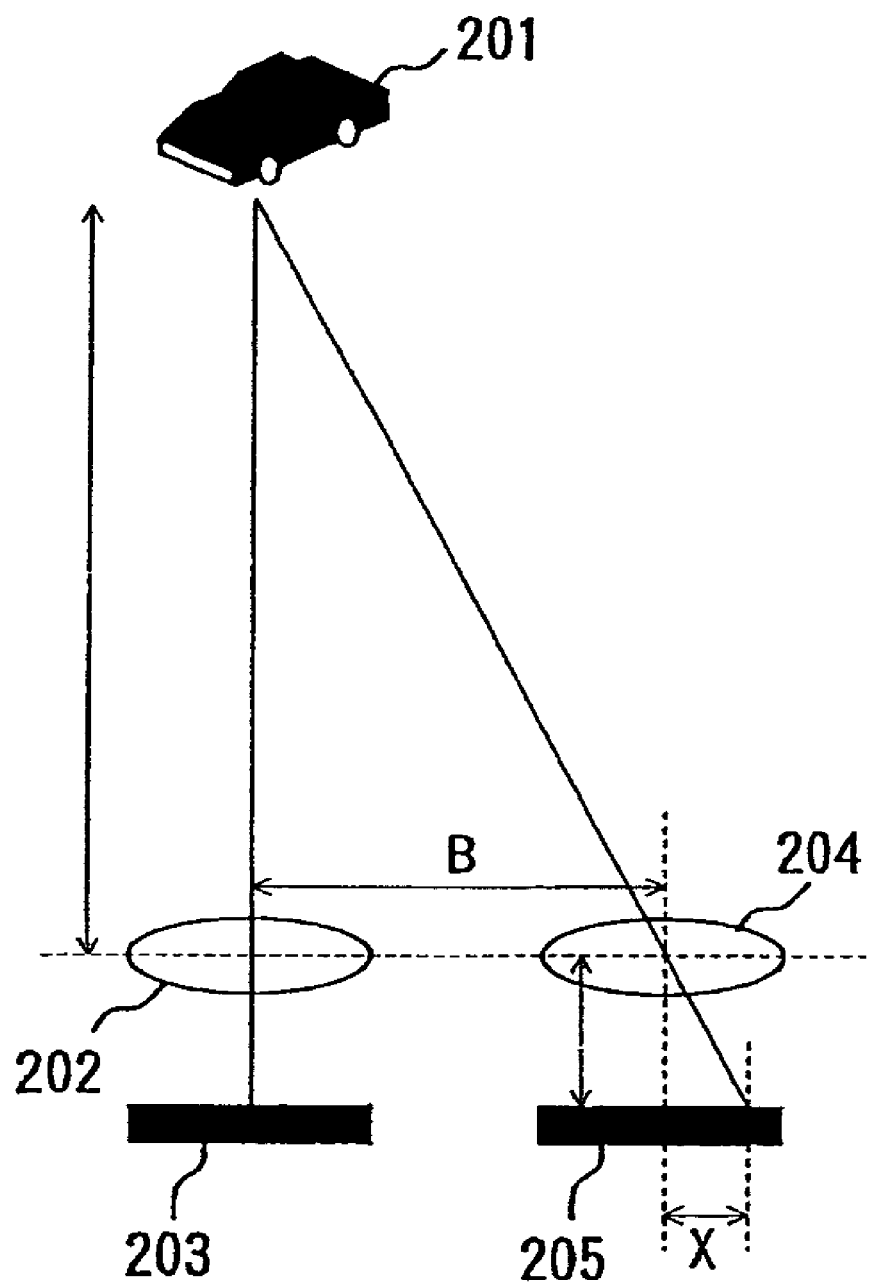
FIG. 3 illustrates a structure of a distance sensor according to a phase difference passive method and a principle of measuring a distance.
Figure 4:
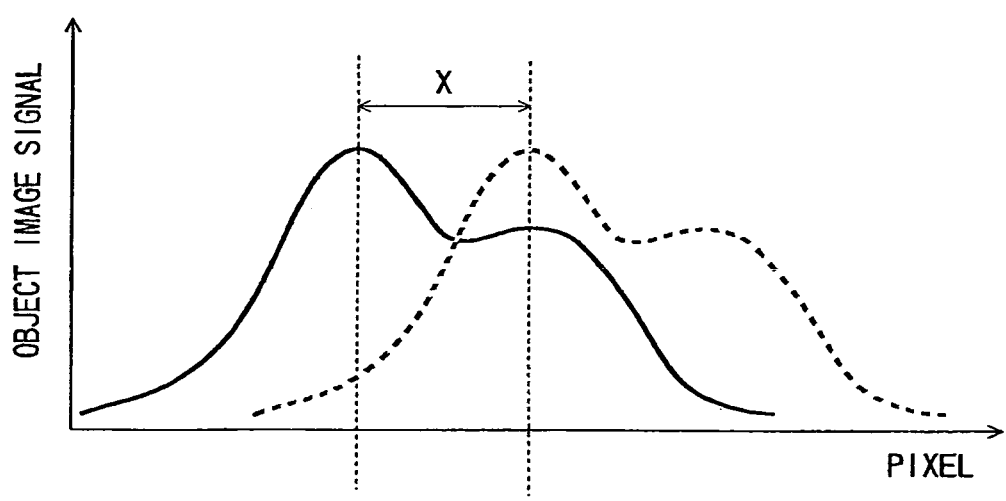
FIG. 4 illustrates an example of an object image signal of a distance sensor according to a phase difference passive method.

The external distance measuring unit 126 is a type of sensor which measures a distance to an object by using an external measuring method, that is, without using the light passed through the image-taking optical system (image-taking lens) and outputs a signal. For the external distance measuring unit 126 (distance detecting unit of an external measuring method), a plurality of types are available. FIG. 3 and FIG. 4 show a principle of measuring the distance by a phase difference passive method, which is one of those types.

In FIG. 3, reference numeral 201 denotes an object, 202 denotes an image-forming lens for a first optical path, 203 denotes a photoreception element array (line sensor) for the first optical path, 204 denotes an image-forming lens for a second optical path and 205 denotes a photoreception element array (line sensor) for a second optical path. The photoreception element arrays 203, 205 of the first and second optical paths are arranged apart by a base line length B. Of the light from the object 201, the light passed through the first optical path by the first image-forming lens 202 forms an image on the photoreception element array 203 and the light passed through the second optical path by the second image-forming lens 204 forms an image on the photoreception element array 205.

Here, FIG. 4 shows examples of the signals read from the photoreception element arrays 203, 205 which have received the two object images formed through the first and second optical paths. Since the two photoreception element arrays are arranged apart by the base line length B, as is seen from FIG. 4, the object image signals are spaced by X pixels. Therefore, it is possible to calculate X by calculating a correlation between the two signals while shifting pixels and determining the amount of pixel shifting corresponding to a maximum correlation. From this X, base line length B, focal lengths f of the image-forming lenses 202, 204, the distance L to the object is calculated based on the principle of triangulation as:

$$L = B \times f / X$$

In addition to such a distance measuring method by using a passive method, there are distance measuring methods according to an active method such as a method for determining the distance from a propagation speed of ultrasonic wave measured using an ultrasonic sensor and a triangulation method using infrared rays projected onto an object often used for a compact camera, etc. However, the distance detecting unit of the present invention is not limited to these distance measuring methods.

The camera/AF microcomputer 114 calculates (or reads from table information) the position of the focus lens unit 105 for achieving focus based on information on the distance to the object measured or detected by the external measuring of distance detection method and focal length information (optical zoom magnifying (enlargement) ratio detected as will be described later) of the image-taking optical system and drives the focus lens unit 105 to the position. This control method is called "external measuring method" (second control method) here.

A zoom switch 116 for the user to perform a zoom operation is connected to the camera/AF microcomputer 114 and according to this operation signal, the camera/AF microcomputer 114 carries out optical zoom control through the control of the zoom motor 110 and electronic zoom control through the control of the camera signal processing circuit 108. The camera signal processing circuit 108 has an electronic zoom function which electrically processes part of the image signal corresponding to a full screen according to a signal for specifying the magnifying ratio from the camera/AF microcomputer 114 and outputs an image enlarged at the magnifying ratio corresponding to the magnifying ratio signal. The image signal enlarged by the camera signal processing circuit 108 is output to the storage unit 109 and monitor unit 115 explained above. Thus, the enlarged image is recorded or displayed on the recording medium or the display of the monitor unit 115.

Then, the control by the optical zoom and electronic zoom of the camera/AF microcomputer 114 on the operation signal of the aforementioned zoom switch 116 will be explained using the flow chart in FIG. 5.

Figure 5:
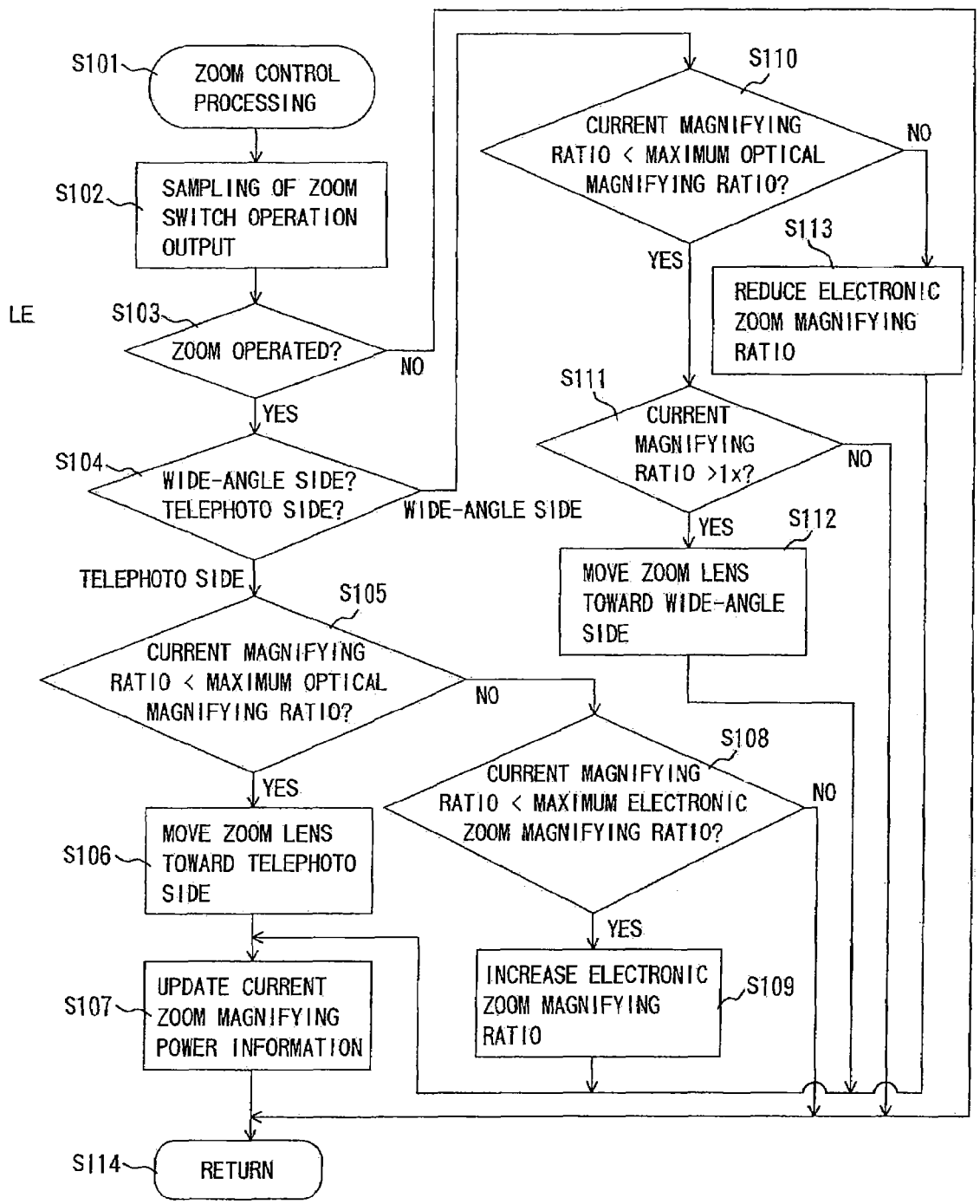
FIG. 5 is a flow chart showing control processing of optical zoom and electronic zoom by an image-taking apparatus according to Embodiment 1.

When a power switch (not shown) is turned on in step S101 in FIG. 5, the camera/AF microcomputer 114 performs to sampling the operation signal (zoom operation signal) from the zoom switch 116 in step S102 first. At this time, the camera/AF microcomputer 114 performs also to reading the information of the current zoom magnifying ratio stored in a memory (not shown).

The current zoom magnifying ratio information corresponding to the optical zoom can be calculated with information converted to a zoom magnifying ratio based on an output from a position sensor (not shown) which detects the position of the zoom lens unit 102 or a drive pulse count value (when the zoom motor 110 is a stepping motor) from a reference position of the zoom motor 110. Furthermore, the zoom magnifying ratio corresponding to the electronic zoom can be calculated from the zoom magnifying (enlargement) ratio information given to the camera signal processing circuit 108 on the last time. The memory stores a value of a multiplication between the zoom magnifying ratio information corresponding to the optical zoom and the zoom magnifying ratio information corresponding to the electronic zoom.

Then, the camera/AF microcomputer 114 determines in step S103 whether a zoom operation signal is output or not. When zoom operation signal is not output, the camera/AF microcomputer 114 determines that the user has not performed zoom operation, the flow proceeds to step S114 to start control processing other than the zoom control.

On the other hand, when the camera/AF microcomputer 114 determines in step S103 that a zoom operation signal is output, it determines in step S104 whether the zoom operation signal corresponds to an operation toward the wide-angle side (e.g., + signal) or the telephoto side (e.g., – signal). When the zoom operation signal corresponds to an operation toward the telephoto side, that is, when the zoom operation is on the telephoto side, the camera/AF microcomputer 114 determines in step S105 whether the current zoom magnifying ratio is smaller than the maximum optical magnifying ratio obtained from the image-taking optical system (movement of the zoom lens unit 102) or not. When it is smaller than the maximum optical magnifying ratio, further optical zoom toward the telephoto side is possible, and therefore in step S106, the camera/AF microcomputer 114 controls the zoom motor 110 and moves the zoom lens unit 102 toward the telephoto side. Then, in step S107, it updates the current zoom magnifying ratio information stored in the memory, the flow proceeds to step S114 to start other control processing.

When it is determined in step S105 that the current zoom magnifying ratio is larger than the maximum optical magnifying ratio, further optical zoom toward the telephoto side is not possible, and therefore the camera/AF microcomputer 114 performs zooming through electronic zoom control. In this case, the camera/AF microcomputer 114 determines in step S108 whether the current zoom magnifying ratio is smaller than the maximum zoom magnifying ratio (hereinafter referred to as "maximum electronic zoom magnifying ratio") obtained by actions (multiplication) of both the optical zoom and the electronic zoom or not. When the current zoom magnifying ratio is smaller than the maximum electronic zoom magnifying ratio, the camera/AF microcomputer 114 sends information representing a magnifying ratio larger than the current magnifying ratio to the camera signal processing circuit 108 in step S109 and increases the electronic zoom magnifying ratio. Then, in step S107, the camera/AF microcomputer 114 updates the current zoom magnifying ratio information, the flow proceeds to step S114.

When the current zoom magnifying ratio reaches the maximum electronic zoom magnifying ratio, further electronic zooming toward the telephoto side is impossible, and therefore the camera/AF microcomputer 114 proceeds to step S114.

Furthermore, when it is determined in step S104 that the zoom operation is on the wide-angle side, the camera/AF microcomputer 114 determines in step S110 whether the current zoom magnifying ratio is smaller than the maximum optical magnifying ratio or not. When it is smaller than the maximum optical magnifying ratio, the camera/AF microcomputer 114 proceeds to step S111.

In step S111, it is determined whether the current zoom magnifying ratio is larger than 1× (widest angle: minimum optical zoom magnifying ratio) or not. When it is larger than 1×, further optical zooming toward the wide-angle side is possible, the camera/AF microcomputer 114 drives the zoom lens unit 102 toward the wide-angle side in step S112 in step S107, updates the current zoom magnifying ratio information and proceeds to step S114.

When the current zoom magnifying ratio reaches 1×, further optical zooming (and electronic zooming) toward the wide-angle side is impossible, and therefore the camera/AF microcomputer 114 proceeds to step S114.

On the other hand, when it is determined in step S110 that the current zoom magnifying ratio is larger than the maximum optical magnifying ratio, zooming is performed toward the wide-angle side through electronic zoom control until the maximum optical magnifying ratio is reached, and therefore the camera/AF microcomputer 114 sends information representing a magnifying ratio smaller than the current magnifying ratio to the camera signal processing circuit 108 in step S113 and reduces the electronic zoom magnifying ratio. Then, the camera/AF microcomputer 114 updates the current zoom magnifying ratio information in step S107 and proceeds to step S114 to start other control processing.

Through the above described processing, the user can perform zoom operation naturally without being aware of switching between optical zoom and electronic zoom. Note that since electronic zoom entails deterioration of image quality as the magnifying ratio increases, it is also possible to change the maximum electronic zoom magnifying ratio according to a selection or setting by the user (e.g., setting any one of 50×, 100×, 200×) or temporarily stop electronic zooming.

Furthermore, with regard to optical zoom control, only the movement of the zoom lens unit 102 has been explained, but in the actual rear-focus optical system, the image surface moves with moving the zoom lens unit 102 (magnification), and therefore the focus lens unit 105 is also moved simultaneously to maintain the in-focus state through the control of the focusing motor 111. This control is performed by calculating information on the target drive position of the focus lens unit 105 with respect to the position to which the zoom lens unit 102 moves from the current position after a predetermined time, which is stored in a memory (not shown) (information representing the position or zoom tracking information representing the track that the focus lens unit 105 should follow) and driving the focus lens unit 105 together with the movement of the zoom lens unit 102 based on the target drive position information. This allows zooming while the in-focus state is being kept.

The present invention is not limited to the above described method of controlling an optical zoom/electronic zoom and the image-taking apparatus which uses the method of maintaining/controlling the image surface, but is also applicable to an image-taking apparatus using other control methods.

Then, AF control which is carried out by the image-taking apparatus of this embodiment according to a processing program will be explained using the flow charts in FIG. 6 and FIG. 7. Here, a case where hybrid AF and TV-AF are switched according to the use/non-use of the electronic zoom function will be explained.

The hybrid AF used in this embodiment performs such control that the focus lens unit 105 is moved close to an in-focus position at high-speed according to an external measuring method (second control method) with a relatively low degree of accuracy and then moved to the in-focus position according to a TV-AF method (first control method) with a high degree of accuracy.

Figure 6:
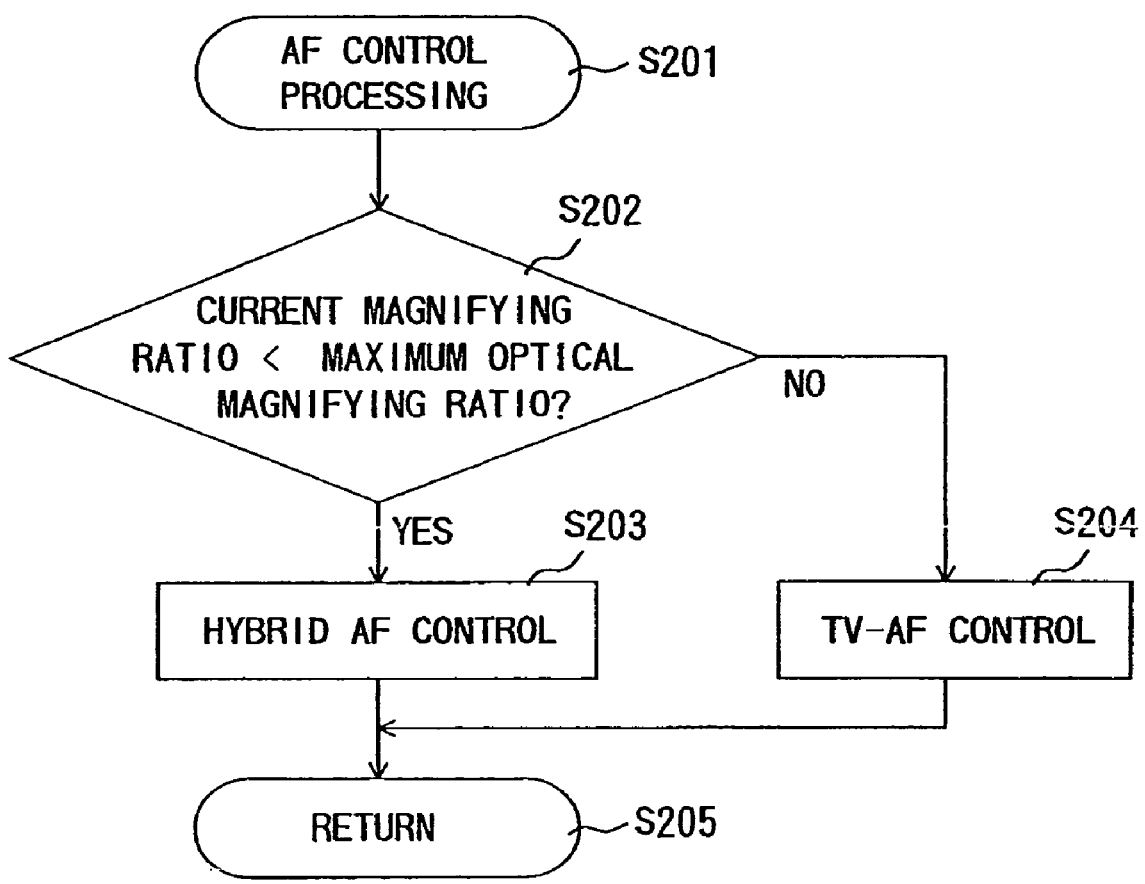
FIG. 6 is a flow chart showing AF control processing by the image-taking apparatus according to Embodiment 1.
Figure 7:
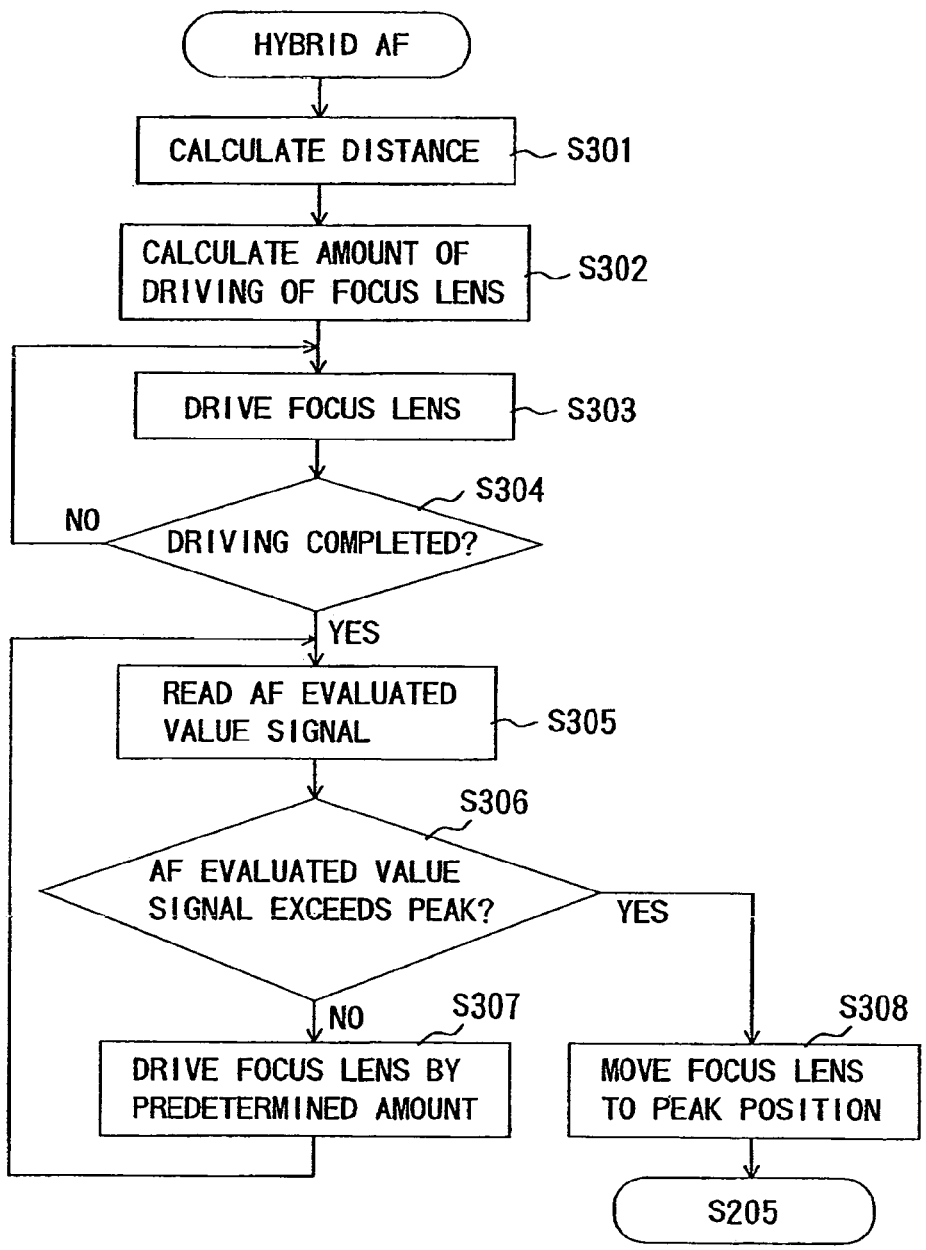
FIG. 7 is a flow chart showing hybrid AF by the image-taking apparatus according- to Embodiment 1.

When the camera is started in an AF mode or an AF switch (not shown) is turned on in step 201 in FIG. 6, the camera/AF microcomputer 114 reads the current zoom magnifying ratio in step S202 and determines whether it is smaller than the maximum optical magnifying ratio or not. When the current zoom magnifying ratio is smaller than the maximum optical magnifying ratio, this means image taking in an optical zoom area (that is, the first zooming state in which the electronic zoom function is not in use), and therefore in the step S203, the camera/AF microcomputer 114 performs AF control through hybrid AF combining the control by a signal from the external distance measuring unit 126 and TV-AF.

Here, hybrid AF carried out in this embodiment will be explained briefly using FIG. 7. First, in step 301, the distance to an object is calculated based on the signal from the external distance measuring unit 126 according to the aforementioned triangulation method.

Then, in step 302, a driving amount of the focus lens unit 105 whereby focus is substantially achieved is calculated based on the calculated object distance, information on the position of the focus lens unit 105 at that time (detected by a position detector (not shown)) and focal length information of the image-taking optical system (position information of the aforementioned zoom lens unit 102). Here, the driving amount may be calculated using a calculation expression or read from table information.

Then, in step 303, driving of the focus lens unit 105 (generation/output of a control signal) is started. In step 304, it is determined whether the driving of the focus lens unit 105 corresponding to the calculated driving amount is completed or not and step 303 is repeated until the driving is completed. Then, when the driving is completed, the camera/AF microcomputer 114 proceeds to step 305. Up to this point is the focus control based on the external measuring method.

Then, the camera/AF microcomputer 114 proceeds to step 305 to start focus control by TV-AF. In step 305, the camera/AF microcomputer 114 takes in an AF evaluated value signal from the AF signal processing circuit 113, stores it in a memory (not shown) and determines in step 306 whether the AF evaluated value signal is a peak value or not. Since it is not possible to determine whether it is a peak value or not from only one AF evaluated value signal, driving (generation/output of a control signal) of the focus lens unit 105 by a predetermined amount in step 307 and reading of the AF evaluated value signal in step 305 are repeated and when the increasing AF evaluated value signal turns to a decrease, it is determined in step 306 that the peak of the AF evaluated value signal has passed.

Then, when it is determined that the peak of the AF evaluated value signal has passed, the camera/AF microcomputer 114 proceeds to step 308 to move the focus lens unit 105 to the position where the peak value of the AF evaluated value is obtained. In this way, it is possible to move the focus lens unit 105 to the position where the AF evaluated value signal becomes a maximum, that is, the in-focus position with a high degree of accuracy.

Once focus is achieved in this way, the camera/AF microcomputer 114 proceeds to step 205 in FIG. 6 to start other control processing of the camera.

Figure 2:
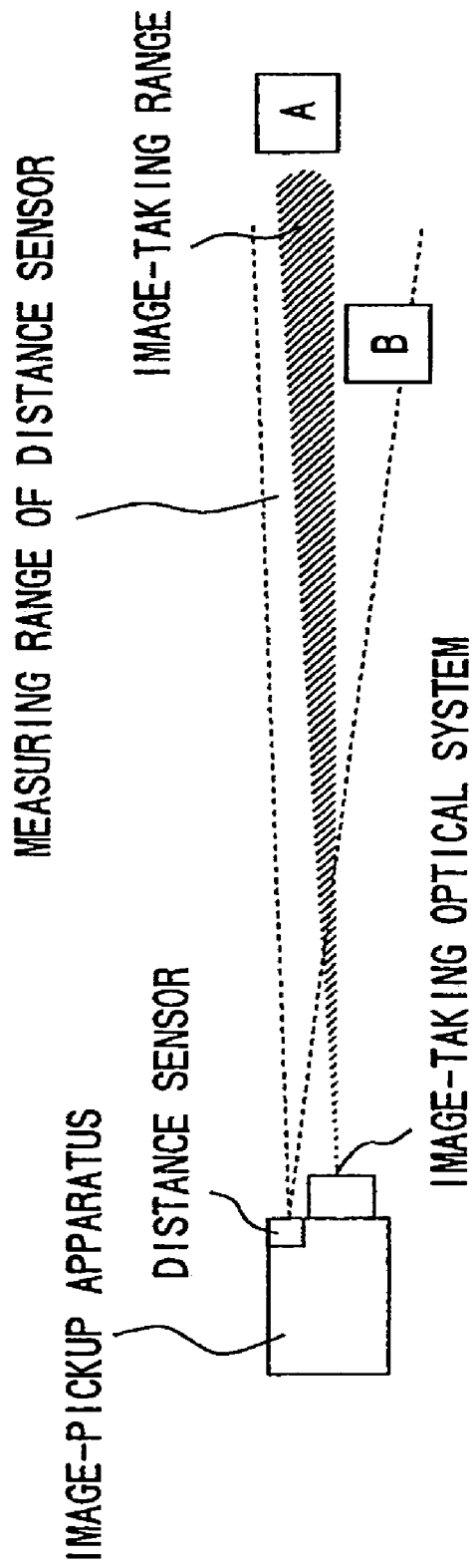
FIG. 2 illustrates parallax between a detection range by a distance sensor and image-taking range when the image-taking angle of view is on the telephoto side.

On the other hand, when the current zoom magnifying ratio is larger than the maximum optical magnifying ratio, this means image taking in the electronic zoom area (that is, a second zooming state in which the electronic zoom function is in use), and therefore in step S204 the camera/AF microcomputer 114 performs AF control (steps 305 to 308 in FIG. 7) only through TV-AF based on an image signal. This represses erroneous operation of the hybrid AF due to parallax between the detection range of the distance sensor (external distance measuring unit 126) and image-taking range explained in FIG. 2. Once in-focus is achieved, the camera/

AF microcomputer 114 proceeds to step S205 to start other control processing of the camera.

For simplicity of explanation, it has been assumed that other control processing of the camera is not carried out until in-focus is achieved, but image signal processing, stop control, recording in a recording medium, etc., are actually executed by means of interrupt servicing, etc., as appropriate.

Figure 8A:
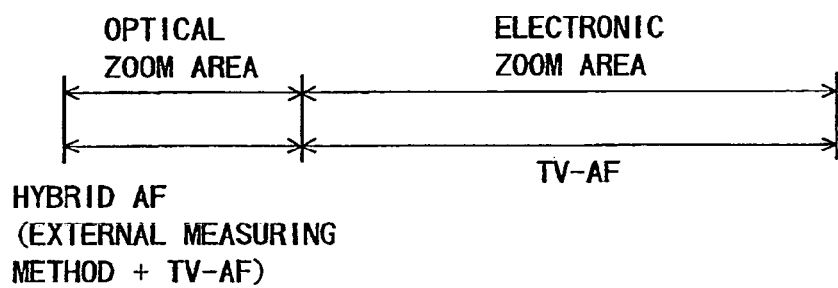
FIG. 8 is a conceptual diagram illustrating switching of a control method used in Embodiment 1.

FIG. 8(A) shows switching between the hybrid AF and TV-AF in the optical zoom area and electronic zoom area.

This embodiment has explained the image-taking apparatus capable of carrying out focus control by using a TV-AF method and focus control by using an external measuring method, but the present invention is also applicable to an image-taking apparatus capable of carrying out focus control according to a different method. For example, it is possible to use a TTL (Through The Lens) phase-difference detection method instead of the TV-AF method. This TTL phase-difference detection method separates light from the image-taking optical system into at least two portions and calculates the amount of defocusing through a correlation calculation between signals from a pair of line sensors which have received two images formed by these separated light beams. Then, it calculates the amount of movement of the focus lens unit from the current position to the in-focus position based on this amount of defocusing and drives the focus lens unit by that amount of movement.

Figure 8B:
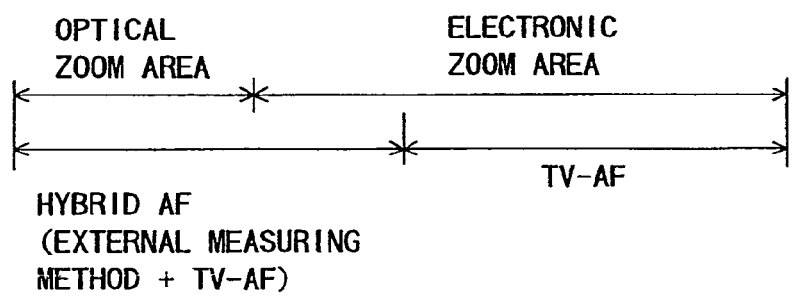

Furthermore, this embodiment has described the case where the hybrid AF and TV-AF are switched (first and second control methods are used when the electronic zoom function is not in use and only the first control method is used when the electronic zoom function is in use) in the optical zoom area and electronic zoom area, but the present invention is not limited to this case. For example, as shown in FIG. 8(B), it is also possible to carry out hybrid AF in the optical zoom area and part of the electronic zoom area (state in which the electronic zoom function is not in use and state in which a zoom magnifying ratio smaller than a predetermined magnifying ratio can be obtained by the electronic zoom function) and carry out TV-AF in a state in which a zoom magnifying ratio larger than the predetermined magnifying ratio can be obtained by the electronic zoom function.

When a problem involving parallax between the detection range of the distance sensor and image taking range occurs especially in only an area with a large zoom magnifying ratio of the electronic zoom area, it is possible to solve this problem and get the merit of the hybrid AF in the largest possible zoom area.

As shown above, according to this embodiment, it is possible to carry out optimum focus control on a set zoom magnifying ratio in the variable range of the whole zoom magnifying ratio including the electronic zoom.

Especially when the first control method is a so-called internal measuring method based on the output signal of the image-pickup device and the second control method is an external measuring method using distance detecting unit according to an external measuring method, using only the internal measuring method in a state in which a high zoom magnifying ratio is set by the electronic zoom can avoid an erroneous operation of focus control caused by parallax between the distance detection range by external measurement and the image-taking range.

While preferred embodiments have been described, it is to be understood that modification and variation of the present invention may be made without departing from scope of the following claims.

This application claims priority from Japanese Patent Application No. 2003-310792 filed on Sep. 2, 2003, which is hereby incorporated by reference herein.

What is claimed is:

1. An image-taking apparatus comprising:
    an image-pickup device which photoelectrically converts an object image formed by an image-taking optical system including a focus lens;
    a signal processing section which generates an image signal based on an output signal of the image-pickup device and has an electronic zoom function electrically processing part of the image signal to generate an enlarged output image; and
    a controller which controls the driving of the focus lens by using a first control method and a second control method which is different from the first control method,
    wherein the first control method is a method in which the focus lens is driven based on a signal output from the image-pickup device, and the second control method is a method in which the focus lens is driven based on a signal representing an object distance obtained by using an optical system different from the image-taking optical system, and
    wherein the controller (a) carries out the first and second control methods in a first zooming state including at least a state in which the electronic zoom function is not in use, and (b) carries out the first control method but not the second control method in a second zooming state using the electronic zoom function, which has a zoom enlargement ratio larger than that of the first zooming state.

2. The image-taking apparatus according to claim 1, wherein the first zooming state is a state in which the electronic zoom function is not in use and the second zooming state is a state in which the electronic zoom function is in use.

3. The image-taking apparatus according to claim 1, wherein the first zooming state is a state in which the electronic zoom function is not in use and a state in which a zoom enlargement ratio smaller than a predetermined enlargement ratio is set by the electronic zoom function, and the second zooming state is a state in which a zoom enlargement ratio larger than the predetermined enlargement ratio is set by the electronic zoom function.

4. The image-taking apparatus according to claim 1, wherein in the first zooming state, the controller controls the driving of the focus lens by using the second control method and then controls the driving of the focus lens by using the first control method.

5. The image-taking apparatus according to claim 1, wherein the first control method controls the driving of the focus lens based on an evaluation signal generated from a predetermined frequency component of the image signal.

6. The image-taking apparatus according to claim 1, further comprising a distance detector which detects the distance to an object by using an external measuring method,
    wherein the second control method is a control method which controls the driving of the focus lens based on the output signal of the distance detector.

7. The image-taking apparatus according to claim 1, wherein the first zooming state includes a state in which an optical zoom by the image-taking optical system is in use.

8. A focus control method for an image-taking apparatus including an image-pickup device which photoelectrically converts an object image formed by an image-taking optical system including a focus lens, generating an image signal based on an output signal of the image-pickup device and having an electronic zoom function which electrically processes part of the image signal to generate an enlarged output image, the method comprising:

a step of controlling the driving of the focus lens by using a first control method;

a step of controlling the driving of the focus lens by using a second control method which is different from the first control method, wherein the first control method is a method in which the focus lens is driven based on a signal output from the image-pickup device, and the second control method is a method in which the focus lens is driven based on a signal representing an object distance obtained by using an optical system different from the image-taking optical system; and a step of carrying out the first and second control methods in a first zooming state including at least a state in which the electronic zoom function is not in use, and carrying out the first control method but not the second control method in a second zooming state using the electronic zoom function, which has a zoom enlargement ratio larger than that of the first zooming state.

* * * * *

UNITED STATES PATENT AND TRADEMARK OFFICE
CERTIFICATE OF CORRECTION

PATENT NO. : 7,423,685 B2
APPLICATION NO. : 10/926958
DATED : September 9, 2008
INVENTOR(S) : Yosuke Morimoto It is certified that error appears in the above-identified patent and that said Letters Patent is hereby corrected as shown below:

COLUMN 2
Line 23, "objects" should read --the objects--.

COLUMN 3
Line 56, "may compose" should read --may be composed--.

Signed and Sealed this

Third Day of February, 2009

JOHN DOLL
*Acting Director of the United States Patent and Trademark Office*